United States Patent
Taylor

(10) Patent No.: US 6,638,983 B1
(45) Date of Patent: *Oct. 28, 2003

(54) DEMULSIFICATION OF WATER-IN-OIL EMULSIONS

(75) Inventor: Grahame N. Taylor, Houston, TX (US)

(73) Assignee: Ondeo Nalco Company, Naperville, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 109 days.

(21) Appl. No.: 09/243,972

(22) Filed: Feb. 4, 1999

(51) Int. Cl.$^7$ .................. B01D 17/05; C10G 33/04; C08L 75/04; C08G 18/50

(52) U.S. Cl. ............... 516/172; 516/173; 210/708; 528/76; 560/26; 560/115; 560/158

(58) Field of Search ............ 528/76; 516/172, 516/173, FOR 146, FOR 163; 560/26, 115, 158; 210/708

(56) References Cited

U.S. PATENT DOCUMENTS

| | | | |
|---|---|---|---|
| 2,754,271 A | 7/1956 | Kirkpatrick | 516/191 |
| 2,929,800 A * | 3/1960 | Hill | 528/65 |
| 2,996,551 A | 8/1961 | De Goote et al. | 568/609 |
| 3,078,271 A | 2/1963 | De Goote et al. | 544/162 |
| 3,383,326 A | 5/1968 | Seale et al. | 516/193 |
| 3,511,882 A | 5/1970 | Seale et al | 568/609 |
| 3,557,017 A | 1/1971 | Mange et al. | 516/159 |
| 3,594,393 A | 7/1971 | Buriks et al. | 516/179 |
| 3,676,501 A | 7/1972 | Seale et al. | 516/193 |
| 3,786,081 A * | 1/1974 | Oppenlaender et al. | 528/76 |
| 3,798,200 A * | 3/1974 | Kaneko et al. | 528/76 |
| 3,835,060 A | 9/1974 | Maddox et al. | 516/158 |
| 4,071,492 A * | 1/1978 | Bethea et al. | 528/76 |
| 4,305,835 A | 12/1981 | Barber et al. | 508/295 |
| 4,374,734 A | 2/1983 | Newcombe | 210/708 |
| 4,481,367 A * | 11/1984 | Knopf | 560/26 |
| 4,870,151 A * | 9/1989 | Scholl et al. | 516/172 |
| 5,407,585 A | 4/1995 | Taylor et al. | 210/708 |
| 5,609,794 A | 3/1997 | Taylor | 516/184 |
| 5,977,398 A * | 11/1999 | Komiya | 528/76 |

FOREIGN PATENT DOCUMENTS

GB 1112908 8/1965

OTHER PUBLICATIONS

Encyclopedia of Polymer Science and Engineering, vol. 8 (John Wiley & Sons, NY, NY, copyright 1987) pp. 450–452 (month unknown). Feb. 1988.*

* cited by examiner

Primary Examiner—Daniel S. Metzmaher
(74) Attorney, Agent, or Firm—Bell Boyd & Lloyd LLC

(57) ABSTRACT

Water-in-Oil emulsions are demulsified using adducts of a) polyalkylene glycols (PAGS) having a molecular weight greater than 6,500 and up to 60,000, ethylene oxide (EO), and diisocyanates (DIs) or b) polyalkylene glycols (PAGs) having a molecular weight greater than 6,500 and up to 60,000 and diisocyanates (DIs). The preferred PAG is polypropylene glycol and the preferred DIs are meta or para tetramethylxylene diisocyanate and toluene diisocyanate.

24 Claims, No Drawings

DEMULSIFICATION OF WATER-IN-OIL EMULSIONS

BACKGROUND OF INVENTION

This invention relates generally to a composition and a method of demulsifying water-in-oil emulsions using adducts of polyalkylene glycol (PAG) derivatives. In one aspect, the method relates to the demulsification of oil field produced fluids using adducts of PAG and ethylene oxide and/or diisocyanates.

In the production of oil from oil wells, the produced fluids frequently include water in the form of free water or emulsion. In order for the oil to be of pipeline quality, it is necessary to reduce the water content to below a specified amount (e. g. below 1.0%).

A variety of mechanical, electrical, and chemical methods are used in the dehydration of produced fluids. The present invention relates specifically to the chemical treatment using chemicals referred to as demulsifiers. A demulsifier is defined as a single or a blend of surfactant compounds in a suitable solvent system which is formulated to treat a particular emulsion on an optimum cost/performance basis. The method of the present invention employs demulsifiers for treating water-in-oil emulsions, the most common type of emulsions encountered in oil field production. It specifically excludes the treatment of oil-in-water type emulsions (i.e., reverse emulsions).

A variety of demulsifiers are known in the art, including those derived from alcohols, fatty acids, fatty amines, glycols, and alkylphenol formaldehyde condensation product.

As noted above, the method of the present invention involves the use of certain polyalkylene glycol derivatives, specifically adducts of a high molecular weight polyalkylene glycols (PAG's) and ethylene oxide and/or diisocyanates.

As illustrated by the following references, PAG's and their derivatives have been long used in the demulsification of oil field produced fluids:

(a) U.S. Pat. No. 4,374,734 discloses the use of polyoxypropylene polyol (mw of 2,000 to 4,500) for the breaking of water-in-oil emulsions wherein the emulsion is produced by surfactant flooding.

(b) U.S. Pat. No. 3,835,060 teaches that conventional demulsifiers include polyoxyalkylene glycol and block polymers of polyoxyethylene-polyoxypropylene.

(c) U.S. Pat. No. 2,754,271 discloses treating agents comprising an addition product of an alkylene oxide with an aliphatic dihydric alcohol and further describes the dihydric alcohol (polyoxypropylene diols) are known to have molecular weights as high as about 3,000.

(d) U.S. Pat. No. 3,557,017 discloses water-in-oil demulsifiers comprising ultra high molecular weight (molecular weight of at least 100,000) polymers. The polymers are selected from a group that includes polyoxyalkylene polymers and copolymers of monomeric alkylene oxides having a single vicinal expoxy group.

(e) Other references which disclose low molecular weight polyalkylene polyhydric reacted with other compounds include U.S. Pat. Nos. 3,383,326; 3,511,882; and 3,676,501.

(f) Other references which disclosed polyhidric alcohols but not glycols include U.S. Pat. Nos. 2,996,551; 3,078,271; and 4,305,835.

(g) U.S. Pat. No. 5,407,585 discloses a water-in-oil demulsifier using adducts prepared by reacting polyalkylene glycol with ethylene oxide or diglycidyl ether.

(h) U.S. Pat. No. 5,609,794 discloses a water-in-oil demulsifier using an adduct of polyalkylene glycol and ethylene glycol which has been esterified and further reacted with a vinyl monomer and a polyhydric material.

SUMMARY OF THE INVENTION

The method of the present invention involves treating water-in-oil emulsions of petroleum operations with a novel demulsifier to break the emulsion and separate the oil and water. The demulsifier is a derivative or adduct of a high molecular weight polyalkylene glycol (PAG) and ethylene oxide (EO) and/or a diisocyanates (DI). The PAG is a diol and is either a polypropylene glycol or a polybutylene glycol and has a molecular weight of greater than 6,000 and up to 60,000, preferably between 7,000 and 26,000.

The preferred demulsifier useable in the present invention is an adduct of PAG, EO and DI having the following formula (I):

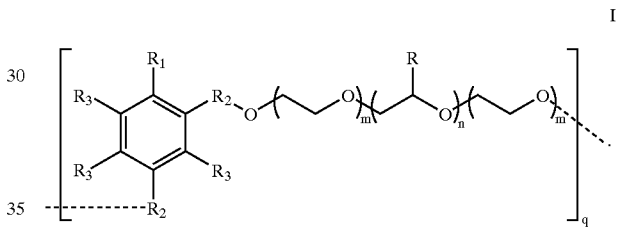

m is an integer ranging from 0 to 100
n is an integer ranging from 50 to 1,000
q is an integer ranging from 1 to 20, preferably 5 to 15
R is $CH_3$ or $C_2H_5$
$R_1$ is $CH_3$ when $R_2$ is —(NHCO)— or $R_1$ is H when $R_2$ is —(C($CH_3$)$_2$NHCO)—
$R_3$ is H.

The demulsifier of Formula I is derived from the meta forms of tetramethylxylene diisocyanate (m-TMXDI) and toluene diisocyanate (m-TDI). Other useful demulsifiers include adducts derived from p-TMXDI and p-TDI, having the following formula (II).

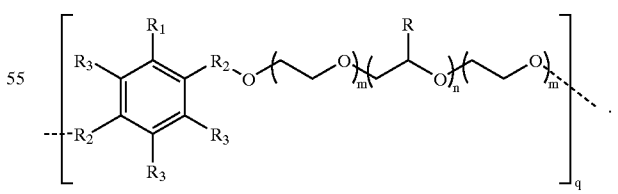

where m, n, q, R, $R_1$, $R_2$, and $R_3$ are as defined in Formula I.

Still other forms of the demulsifier useable in the method of the present invention include those derived from 2,6 toluene diisocyanates (2,6-TDI) having the following formula (III):

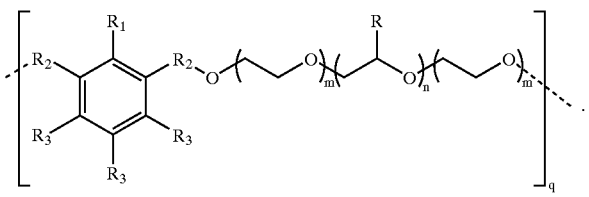

where m, n, q, R, $R_1$, and $R_3$ are as defined in Formula I, and '$R_2$ is —(NHCO)—

The demulsifier of the present invention is thus seen to be adducts of DI selected from the group consisting of m-TMXDI, m-TDI, p-TMXDI, p-TDI, and 2,6-TDI. The preferred adducts include those with high molecular weight PAG's, and the most preferred demulsifiers include PAG/EO/DI adducts.

DESCRIPTION OF THE PREFERRED EMBODIMENTS

As indicated above, the polyalkylene glycol derivative contemplated for use in the method of the present invention is an adduct of high molecular weight PAG and EO and/or DI.

The precursor PAG in a preferred embodiment of the present and has the following formula (IV):

$$\text{HO}[\text{RCH—CH}_2\text{—O}]_n\text{—H} \qquad \text{IV.}$$

where R is $CH_3$ or $C_2H_5$; and n ranges from 50 to 1,000, preferably 120 to 350, and most preferable 135 to 260; and the compound has a molecular weight greater than 6,000 and up to 60,000. Preferably R is $CH_3$ and the molecular weight of the polyalkylene glycol is between 6,000 and 60,000, preferably between 7,000 and 26,000, and most preferably between 8,000 and 20,000. (The term molecular weight as used herein refers to that calculated from hydroxyl number measurement.)

The precursor PAG having the proper molecular weight for use in the method of the present invention may be prepared using a catalyst selected from the group consisting of barium, strontium and their oxides, hydroxides, hydrated hydroxides or monohydroxide salt, or mixtures thereof or a double metal cyanide complex compound wherein one of the metals of said complex compound is selected from the group consisting of Zn(II), Fe(II), Fe(III), Co(II), Ni(II), Mo(IV), Mo(VI), Al(III), V(IV), V(V), Sr(II), W(IV), W(VI), Mn(II), and Cr(III) and mixtures thereof. The methods of preparing the high molecular weight PAG's are described in detail in U.S. Pat. Nos. 5,010,187 and 3,278,457, the disclosures of which are incorporated herein by reference.

As indicated above, the present invention contemplates the use of two adducts:

(a) adducts of PAG, EO, and DI, and (b) adducts of PAG, and DI.

Adducts of PAG, EO, and DI

The addition reaction of the PAG of Formula IV with ethylene oxide forms a product having the following formula (V):

$$\text{HO—(CH}_2\text{—CH}_2\text{O)}_m\text{—(CH}_2\text{—CRHO)}_n\text{—(CH}_2\text{—CH}_2\text{O)}_m\text{—H} \qquad \text{V.}$$

where

R is $CH_3$ or $C_2H_5$;

m is an integer ranging from 1 to 100, preferably 5 to 80, and most preferably 5 to 50;

n is an integer ranging from 50 to 1,000, preferably 120 to 350, and most preferably 135 to 260.

This reaction may be carried out under the following conditions: The polyalkylene glycol is dissolved in a hydrocarbon solvent and catalyzed with an alkaline or alkaline earth metal hydroxide. The partial alkoxide of the polyalkylene glycol is reacted at 150° C. at 50 psi with ethylene oxide for approximately two hours.

The PAG/EO adduct of Formula V is reacted with DI to form Formula I as illustrated below:

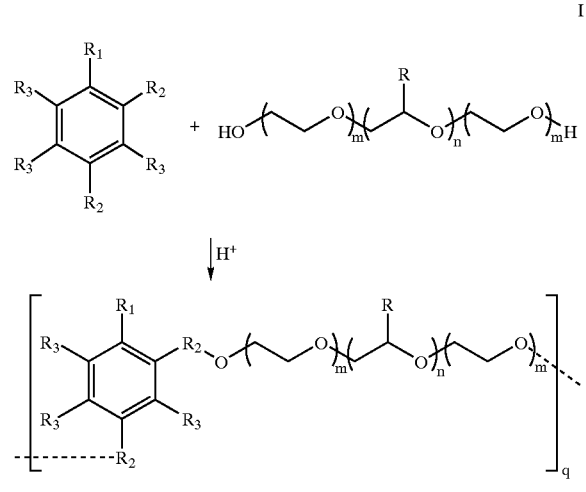

where R, $R_1$, $R_2$, $R_3$, m, n, and q are as described above.

The hydrogen ion may be provided by any hydrogen donor such as acetic acid.

The compound of Formula I is derived from the meta form of the DI. It will be recognized by those skilled in the art that the Formulas II and III may be obtained by the above reaction starting with the para or 2,6 isomers of DI.

In a preferred embodiment, R is $CH_3$, $R_1$ is $CH_3$, and $R_2$ is —(NHCO)—, in which case Formula I becomes Formula IA:

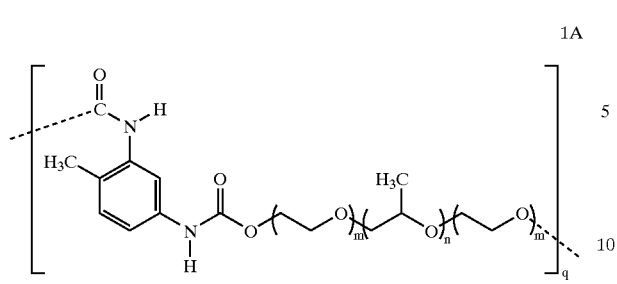

In another preferred embodiment, R, and $R_3$ are the same as Formula IA, but $R_1$ is H and $R_2$ is —(C(CH$_3$)$_2$NHCO)— in which case Formula I becomes Formula IB.

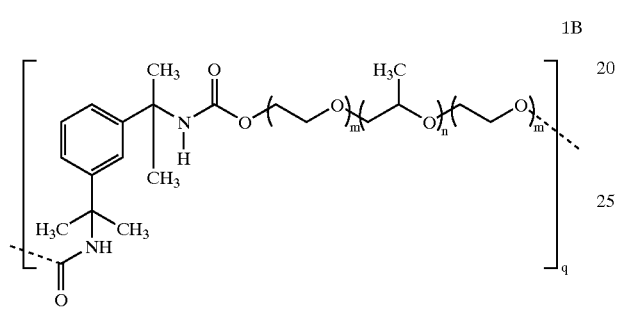

The demulsifiers of Formula II and III using the para and 2, 6 isomers, will yield formulas the same as those depicted in IA and IB except for the positions of the isocyanate groups on the toluene rings.

The addition reactions and reaction conditions for making the demulsifiers of Formula IA and IB described in more detail below.

The mole ratio of the three components in the PAG/EO/DI adducts may be as follows:

|  | PAG | EO | DI |
| --- | --- | --- | --- |
| Range (mols) | 0.1 to 20 | 1 to 300 | 0.1 to 20 |
| Preferred range (mols) | 0.2 to 5.0 | 3 to 100 | 0.2 to 5.0 |
| Most preferred range (mols) | 0.5 to 2.0 | 5 to 40 | 0.5 to 2.0 |

Adducts of PAG and DI

The reaction of PAG and DI in the presence of H$^+$ yields the following product (Formula II).

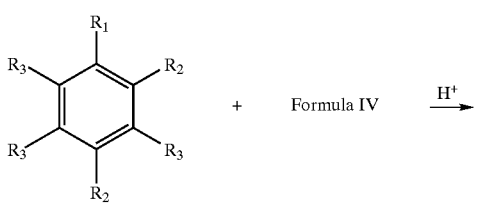

where R, $R_1$, $R_2$, $R_3$, n, and q are defined in Formula I. Where $R_2$ is —(NHCO)—, R is CH$_3$, and $R_1$ is CH$_3$, Formula II becomes Formula IIA.

IIA

Where $R_2$ is —(C(CH$_3$)$_2$NHCO)—, R=CH$_3$ and $R_1$=H, Formula II becomes Formula IIB.

IIB

As in the case of preparation of the demulsification of 1A and 1B, the adducts of PAG and DI may be prepared using the meta, para, or 2,6 isomers of DI, the formulas of these products will be similar to IIA and IIB, except for the positions of the isocyanate groups on the toluene ring.

The mole ratio of the PAG/DI adducts may be as follows:

|  | PAG | DI |
| --- | --- | --- |
| Range (mols) | 0.1 to 20 | 0.1 to 20 |
| Preferred range (mols) | 0.2 to 5.0 | 0.2 to 5.0 |
| Most preferred range (mols) | 0.5 to 2.0 | 0.5 to 2.0 |

Operation

In utilizing the demulsifier (i.e. adducts PAG/EO/DI or PAG/DI as described above) in the method of present invention a formulation comprising the adducts dissolved in a suitable solvent is prepared. The formulation may include other additives which provide additional function or enhancement to the effectiveness of the demulsifier. Solvents include aromatic hydrocarbon solvents such as xylene, etc. Additional additives include commercial demulsifiers such as polyalkylene glycol esters and oxyalkylated phenol formaldehyde resins.

The percent of active adduct in the formulation may range within wide limits, but 5 to 90 wt % is preferred, and 25 to 75 wt % is most preferred.

The composition and concentration of the actives in the formulation will be tailored for a specific treatment in the same manner conventional demulsifiers are applied. This "fine tuning" of the formulation is frequently based on bottle tests. For crude oil treatment, the water-in-crude oil emulsion may range from 1 to 99 vol % water. Treatment concentrations of the adduct demulsifier (actives) described herein may range from 10 to 1,000 ppm, preferably 50 to 1000 ppm and most preferably 100 to 1000 ppm actives in the emulsion, and may be injected into the system by conventional procedure and equipment: downhole injection, wellhead injection, or batch treatment.

In treating refined petroleum products (e.g. lube oil, gasoline, fuel oil, kerosene, etc.), the suspended water, of course, is much lower, generally less than 1%.

Although formulation for these treatments will likely be different than crude oil treatments, the adducts will be an essential component.

In tailoring the demulsifier formulation for a particular treatment, it may be preferred in many such operations to combine the demulsifiers described above with other demulsifiers. The commercially available demulsifier which can be used in a blend with the adducts described above include the following:

(a) polyfunctional polyalkylene glycols (b) oxyalkylated phenol formaldehyde resins having a molecular weight between 1,000 to 20,000.

(c) derivatives of the above These commercially available demulsifiers are oxyalkylation products of ethylene of propylene oxide with fatty acids, fatty amines, glycols, or phenol-formaldehyde condensation compounds.

When blends are used, the adducts described herein should constitute from 5 to 95 vol. % of the blend in a solvent.

EXPERIMENTS

Bottle tests were conducted by placing a water-in-oil emulsion sample (100 ml) in a graduated prescription bottle and adding a measured amount of a demulsifier chemical. Each bottle was capped and then shaken for a specified time (typically 5 minutes) in order to mix the contents. The bottles were set aside in a hot water bath and the waterdrop was observed. This is the time for the separation of the water phase of the emulsion from the oil phase.

Following the waterdrop tests, each emulsion sample (free of freewater) was subjected to a centrifuging (grindout) procedure:

(a) API centrifuge tubes were filled with 50% xylene and 50% of the emulsion (no free water)

(b) the samples were placed in a hot water bath for a recorded period of time (c) the samples were then centrifuged at 1,800 rpm for 3 minutes (d) the amount of water in each tube was recorded and the % of water retained in the oil determined.

Many of the demulsifiers tested were as follows:

| Sample | DI | m | n | MW of PAG | DI Manufacturer |
|---|---|---|---|---|---|
| A | TDI | 0 | 202 | 11,716 | ARCO Chemical |
| B | TDI | 5 | 202 | 12,156 | ARCO Chemical |
| C | TDI | 15 | 202 | 13,036 | ARCO Chemical |
| D | TDI | 40 | 65 | 7,290 | ARCO Chemical |
| E | TMXDI | 5 | 202 | 12,156 | Cytec |
| F | TMXDI | 15 | 202 | 13,036 | Cytec |
| G | TMXDI | 40 | 65 | 7,290 | Cytec |
| H | TMXDI | 30 | 202 | 14,356 | Cytec |

The samples were prepared as follows: Each sample was an EO end-capped polypropylene glycol reacted with TDI or TMXDI. TDI was toluene diisocyanate purchased from Arco Chemical Company and TMXDI was purchased from Cytec 100 parts polyalkylene glycol (PAG) of the general Formula IV was dissolved in an equal volume of a dry aromatic solvent under nitrogen. To this was added between 0.005 and 0.1 parts of a tin IV compound such as dialkyl tin salt of a long chain of fatty carboxylic acid. To this was added between 0.1 and 20 parts of TMXDI (1,3 Bis(1-isocyanato-1-methylethyl)-benzene or tetramethylxylene diisocyanate) drop wise at room temperature. The solution was stirred at room temperature for six hours and the reaction was determined to be complete by the disappearance of the 1733 cm-1 band in the IR spectrum.

100 parts polyalkylene glycol (PAG) of the general Formula IV were dissolved in an equal volume of a dry aromatic solvent under nitrogen. Between 0.15 parts and 30 parts of TDI and 1 part of glacial acetic acid were added to the above solution and the reaction mixture was stirred at room temperature for six hours and the reaction was determined to be complete by the disappearance of the 1733 cm-1 band in the IR spectrum.

The bottle tests were carried out at two concentrations (300 ppm and 600 ppm of active demulsifier in the test samples) and the % of free water separating after a predetermined time (5 min, and 30 min or 420 min).

The results are presented in Table I on the following page.

TABLE I

| | 300 PPM ACTIVES | | | 600 PPM ACTIVES | | |
|---|---|---|---|---|---|---|
| SAMPLE | 5 MIN | 30 MIN | 420 MIN | 5 MIN | 30 MIN | 420 MIN |
| CONTROL | 0 | 0 | 0 | 0 | 0 | 0 |
| A | 1 | 3 | 18 | 2 | 3 | 18 |
| B | 1 | 2 | 21 | 3 | 8 | 21 |
| C | 18 | 20 | 20 | 30 | 32 | 32 |
| D | 10 | 12 | 23 | 28 | 30 | 30 |
| E | 2 | 2 | 19 | 8 | 8 | 19 |
| F | 22 | 26 | 25 | 39 | 38 | 38 |
| G | 8 | 10 | 23 | 25 | 25 | 25 |
| H | 10 | 10 | 10 | 20 | 22 | 22 |

From the above test, it can be seen that the demulsifiers caused the water to separate quickly (5 min). The initial water drop (5 and 30 min) is most important for demulsifiers and C is superior to D in this respect. This improvement is due to the increase in PAG molecular weight from 7,290 to 13,036. TMXDI offers an improvement over TDI in this respect as shown by the improvement of F over C.

Bottle tests were carried out on an oilfield emulsion using Samples C and G. The tests are summarized in Table II.

TABLE II

| SAMPLE | PPM TREATMENT | ELAPSED TIME (MINUTES) | | | % WATER SEPARATED |
|---|---|---|---|---|---|
| | | 15 | 30 | 45 | |
| C | 100 | 52 | 58 | 58 | 94.6 |
| G | 100 | TR. | 50 | 50 | 92.1 |

The data presented in Table II demonstrate the effective of both the TDI (Sample C) and TMXDI (Sample G) in quickly removing water at a relatively low concentration (100 ppm).

The data of Tables I and II indicate the preferred treatment range is between about 50 to 1,000 ppm, most preferrably between about 100 ppm to 1,000 ppm.

What is claimed is:

1. A method of demulsifying water-in-oil emulsions wherein an effective amount of a demulsifying agent is introduced into the emulsion to separate the emulsion into a water phase and an oil phase, said agent being the reaction product of:
   (a) diisocyanate; and
   (b) a compound selected from the group consisting of
      (i) a polyalkylene glycol having a molecular weight ranging from about 11,716 to about 60,000 and wherein the alkylene group consists of from 3 to 4 carbon atoms and;
      (ii) an adduct of ethylene oxide and a polyalkylene glycol having a molecular weight ranging from about 11,716 to about 60,000 and wherein the alkylene group consists of from 3 to 4 atoms.

2. The method of claim 1 wherein the polyalkylene glycol has a molecular weight of 11,716 to 26,000.

3. The method of claim 1 wherein the (b) compound is an adduct having the following formula:

$$HO-(CH_2CH_2O)_m(CH_2CRHO)_n(CH_2CH_2O)_m-H$$

where
   n is an integer defining the molecular weight ranging from about 11,716 to about 60,000,
   m is an integer ranging from 1 to 100, and
   R is $CH_3$ or $C_2H_5$.

4. The method of claim 3 wherein n ranges from 202 to 350.

5. The method of claim 4 wherein m ranges from 5 to 50.

6. The method of claim 3 wherein R is $CH_3$.

7. The method of claim 1 wherein the demulsifying agent is introduced into the emulsion to provide the emulsion with from 10 to 1,000 ppm of the demulsifying agent.

8. The method of claim 1 wherein the reaction product has the following formula (I)

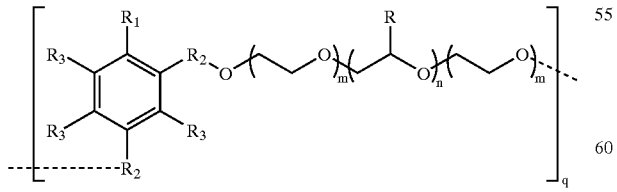

m is an integer ranging from 0 to 100,
n is an integer defining the molecular weight ranging from about 11,716 to about 60,000,
q is an integer ranging from 1 to 20,
R is $CH_3$ or $C_2H_5$,
R is $CH_3$ when $R_2$ is —(NHCO)— and $R_1$ is H when $R_2$ is (C(CH_3)_2NHCO)—,
$R_2$ is —(NHCO)— or —(C(CH_3)_2NHCO)—, and
$R_3$ is H.

9. The method of claim 8 wherein the reaction product has the following formula:

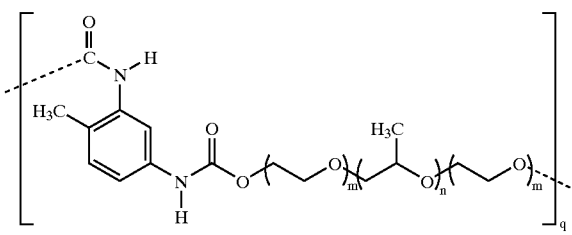

where m, n and q are as defined in claim 8.

10. The method of claim 8 wherein the reaction product has the following formula (1B):

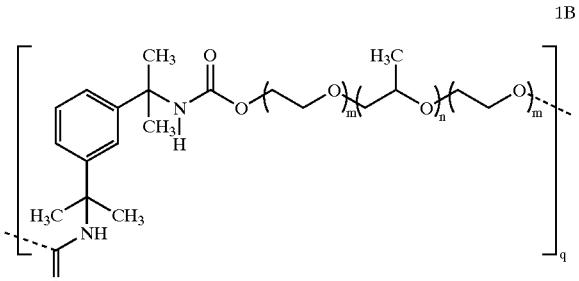

where m, n and q are as defined in claim 8.

11. The method of claim 8 wherein the reaction product has the following formula: IIA

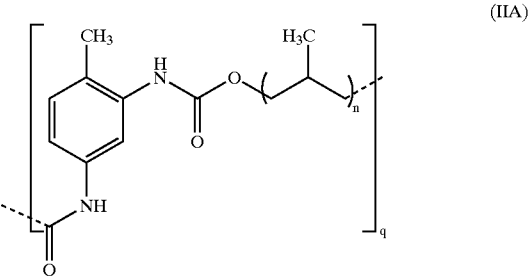

where n and q are as defined in claim 8.

12. The method of claim 8 wherein the reaction product has the following formula: IIB

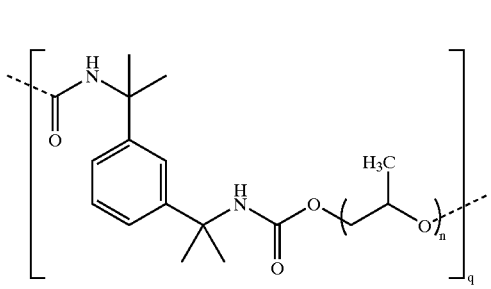

where n and q are as defined in claim 8.

13. The method of claim 1 wherein the reaction product has the following formula (II):

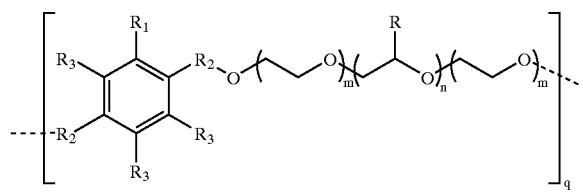

where m is an integer ranging from 0 to 100, n is an integer defining the molecular weight ranging from about 11,716 to about 60,000, q is an integer ranging from 1 to 20, R is $CH_3$ or $C_2H_5$, R is $CH_3$ when $R_2$ is —(NHCO)— and $R_1$ is H when $R_2$ is $(C(CH_3)_2NHCO)$—, $R_2$ is —(NHCO)— or —$(C(CH_3)_2NHCO)$—, and $R_3$ is H.

14. The method of claim 1 wherein the diisocyanate is selected from the group consisting of meta and para forms of tetramethylxylene diisocyanate, meta and para forms of toluene diisocyanate, and 2,6 toluene diisocyanate.

15. A demulsifying agent for demulsifying water-in-oil emulsions comprising the reaction product of:

(a) disocyanate; and (b) a compound selected from the group consisting of:

(i) a polyalkylene glycol having a molecular weight ranging from about 11,716 to about 60,000 and wherein the alkylene group consists of from 3 to 4 carbon atoms and;

(ii) an adduct of ethylene oxide and a polyalkylene glycol having a molecular weight ranging from about 11,716 to about 60,000 and wherein the alkylene group consists of from 3 to 4 atoms.

16. The demulsifying agent of claim 15 wherein the diisocyanate is selected from the group consisting of meta and para forms of tetramethylxylene diisocyanate, meta and para forms of toluene diisocyanate, and 2,6 toluene diisocyanate.

17. The demulsifying agent of claim 15 wherein the demulsifying agent has the following formula:

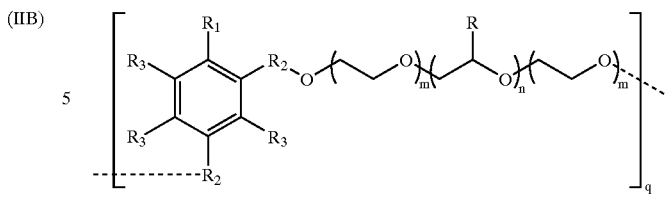

where m is an integer ranging from 0 to 100, $R_1$ is $CH_3$ when $R_2$ is —(NHCO)— and $R_1$ is H when $R_2$ is $(C(CH_3)_2NHCO)$—, $R_2$ is —(NHCO)— or —$(C(CH_3)_2NHCO)$—, R is $CH_3$ or $C_2H_5$, n is an integer defining the molecular weight ranging from about 11,716 to about 60,000, q is an integer ranging from 1 to 20, and $R_3$ is H.

18. The demulsifying agent of claim 15 wherein the polyalkylene glycol is polypropylene glycol having a molecular weight of 11,716 to 20,000.

19. The demulsifying agent of claim 18 wherein the reaction product has the following formula (1A):

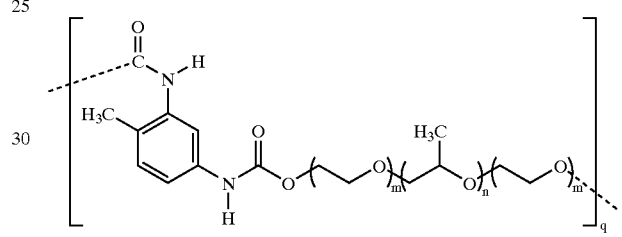

where m is an integer ranging from 0 to 100, n is an integer defining the molecular weight ranging from about 11,716 to about 60,000, and q is an integer ranging from 1 to 20.

20. The demulsifying agent of claim 18 wherein the reaction product has the following formula (1B):

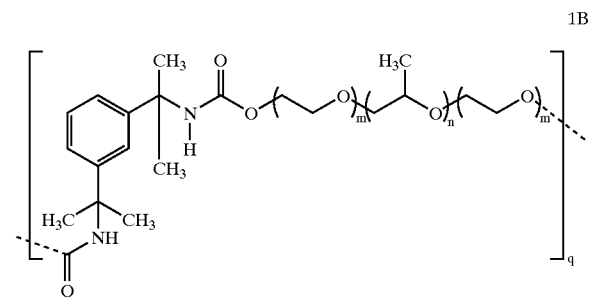

where m is an integer ranging from 0 to 100, n is an integer defining the molecular weight ranging from about 11,716 to about 60,000, and q is an integer ranging from 1 to 20.

21. A method of demulsifying water-in-oil emulsions wherein an effective amount of a demulsifying agent is introduced into the emulsion to separate the emulsion into a water phase and an oil phase, said agent being the reaction product having the following formula:

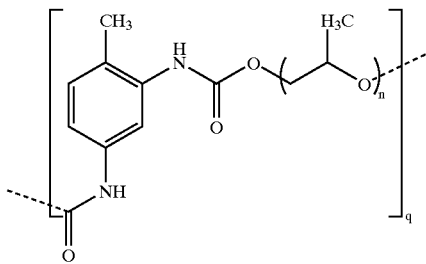

where n is an integer ranging from 120 to 1,000, and where is an integer ranging from 1 to 20.

22. A method of demulsifying water-in-oil emulsions wherein an effective amount of a demulsifying agent is introduced into the emulsion to separate the emulsion into a water phase and an oil phase, said agent being the reaction product having the following formula:

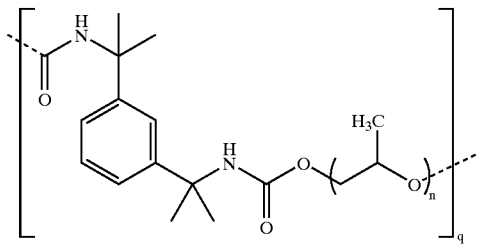

where n is an integer ranging from 120 to 1,000, and where is an integer ranging from 1 to 20.

23. A demulsifying agent for demulsifying water-in-oil emulsions comprising the reaction product having the following formula:

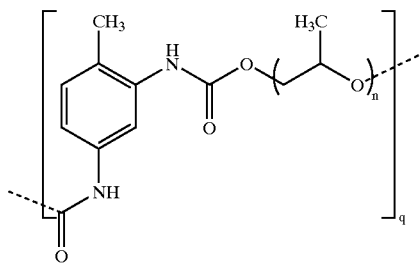

where n is an integer ranging from 120 to 1,000, and where is an integer ranging from 1 to 20.

24. A demulsifying agent for demulsifying water-in-oil emulsions comprising the reaction product having the following formula:

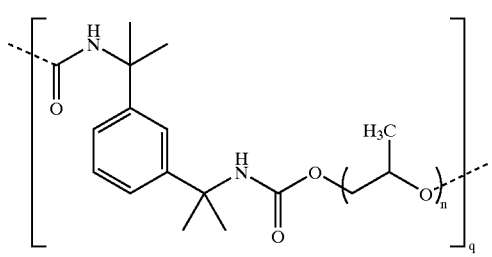

where n is an integer ranging from 120 to 1,000, and where is an integer ranging from 1 to 20.

* * * * *